(12) United States Patent
Piska

(10) Patent No.: US 7,441,509 B2
(45) Date of Patent: Oct. 28, 2008

(54) ICE FISH CASTING SUBMARINE HAVING BAIT/LURE CARRYING COMPARTMENT

(76) Inventor: Mark T. Piska, 2656 89th St., Edmonton, Alberta (CA) T6K 2Z3

( * ) Notice: Subject to any disclaimer, the term of this patent is extended or adjusted under 35 U.S.C. 154(b) by 0 days.

(21) Appl. No.: 11/702,290

(22) Filed: Feb. 6, 2007

(65) Prior Publication Data

US 2008/0184612 A1   Aug. 7, 2008

(51) Int. Cl.
*B63G 8/00* (2006.01)
*B63G 8/28* (2006.01)
*B63G 8/08* (2006.01)
*A01K 89/00* (2006.01)
*A01K 85/00* (2006.01)

(52) U.S. Cl. .................. 114/321; 114/312; 114/320; 114/337; 114/338; 43/26.1; 43/26.2

(58) Field of Classification Search ........... 114/312, 114/313, 321, 326, 328–338, 342, 320; 43/26.1, 43/26.2

See application file for complete search history.

(56) References Cited

U.S. PATENT DOCUMENTS

| 5,077,929 A * | 1/1992 | Khan ................ 43/26.1 |
| 6,122,852 A * | 9/2000 | Mechling, IV ........ 43/4 |
| 6,822,927 B1 * | 11/2004 | Holm ................ 367/107 |

* cited by examiner

*Primary Examiner*—Lars A Olson
*Assistant Examiner*—Daniel V Venne
(74) *Attorney, Agent, or Firm*—Red Gallagher

(57) ABSTRACT

An ice fishing submarine for carrying an end portion of a fishing line radially away from an ice fishing hole comprising: i) a hull enclosing a propulsion system which includes a battery which powers an electric motor which turns a propeller; ii) a power switch to begin propulsion away from the ice hole; and, iii) a tether having an unfixed end secured to the submarine and configured to interrupt power to the propulsion system when the tether becomes taut. When the submarine travels the distance of the length of the tether radially away from the ice hole the tether then becomes taut thereby automatically switching power off to the propulsion system of the submarine, and thereby eliminating the necessity of running control wires extending down through the ice hole to the submarine and monitoring the travel of the submarine to turn off power at an appropriate time.

12 Claims, 1 Drawing Sheet

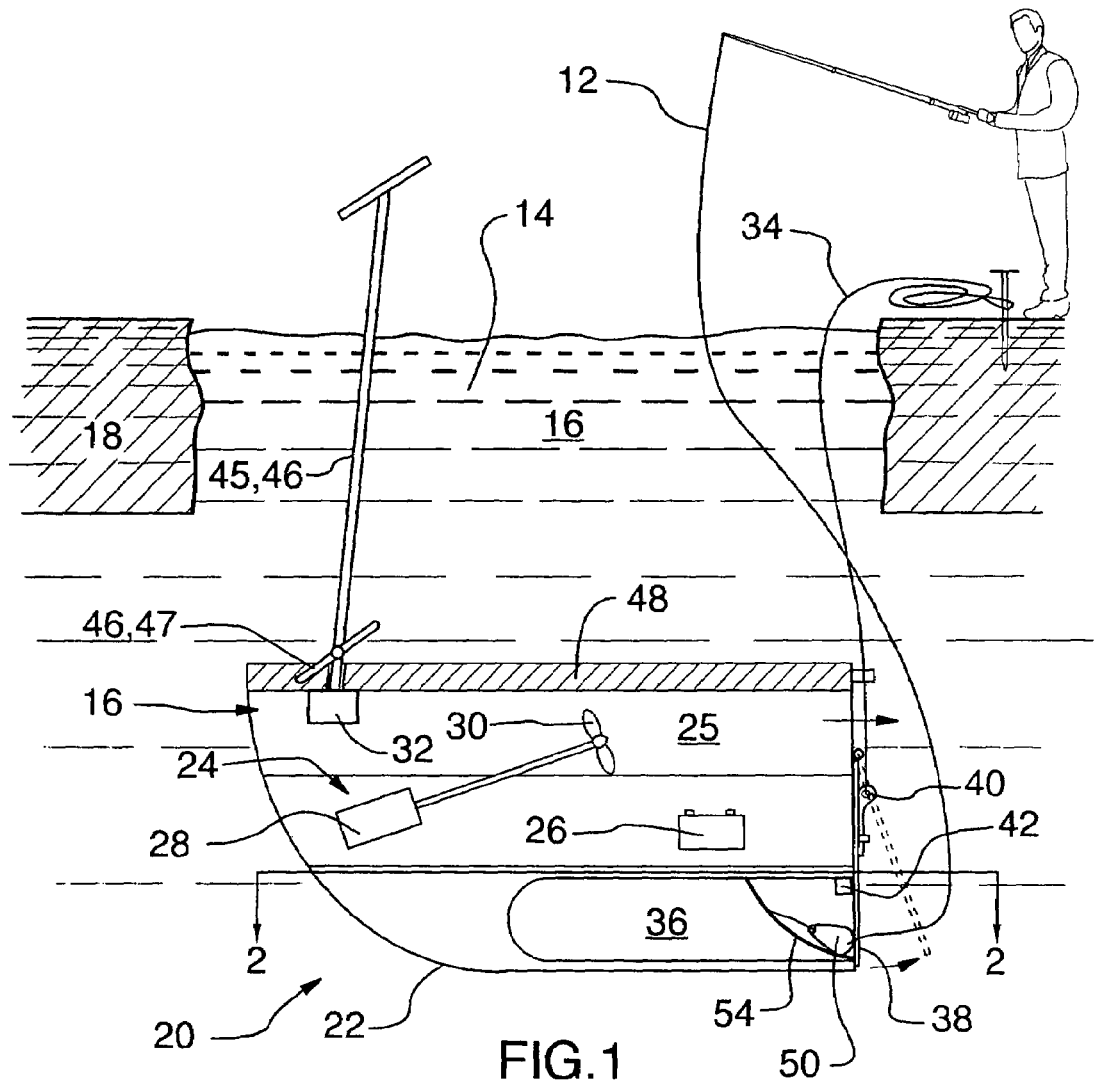
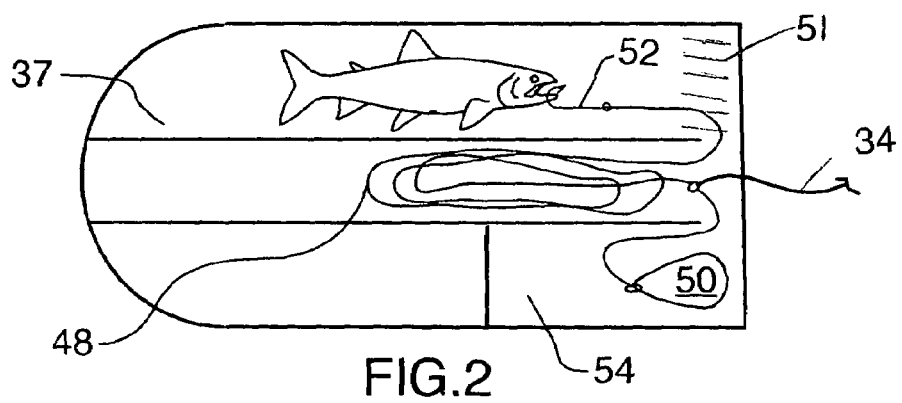

ICE FISH CASTING SUBMARINE HAVING BAIT/LURE CARRYING COMPARTMENT

FIELD OF THE INVENTION

This invention relates to apparatuses used to carry bait and lures underwater radially away from the hole in the ice. More particularly this invention relates to a submarine which has a bait/lure carrying compartment, a deployment stick which activates propulsion within the submarine when detached, and a tether which deactivates propulsion and releases the bait/lure when it becomes taunt. The need for external power and control systems or wires is negated. Launching the sub is unencumbered, convenient, and simple when only a tether extends from the submarine.

BACKGROUND OF THE INVENTION

The idea of carrying a lure or bait under the ice away from a fishing hole in the ice is not new. U.S. Pat. No. 6,822,927 issued to C. E. Holm is for a submersible ice fishing troller system. The submersible unit tows a cable which comprises a power line as well as other multiple control lines. It additionally tows a fishing line terminating with a bait/lure. The weight of the power and control lines necessitate controls for sensing and controlling depth of the submersible unit. The problem with the unit is that its complication and towed power and control lines make it expensive to produce and cumbersome to use. U.S. Pat. No. 6,122,852 issued to R. Mechlin IV is for an ice fishing lure transport. This unit also tows a power and control line. The power and control line utilizes spaced floats to carry its weight. The submersible unit employs traction wheels which contact the surface ice above the apparatus. Use of this unit also suffers from the inconvenience of towing power and control lines which are intermittently are surrounded by floats which may catch on the ice. However, the worst problem with this apparatus relates to the traction wheel drive. When one of the wheels slips, the unit spins. For convenience and simplicity of use what is needed is a submersible unit which operates without the need to tow relatively heavy power and control lines. Elimination of the end portion of the fishing line having hooks and weights extending down beneath the submersible unit would also simplify the insertion and launching of the unit.

OBJECTS OF THE INVENTION

It is an object of this invention to disclose an ice casting submarine having a bait/lure compartment to carry an end portion of a fishing line. It is contemplated that the end portion of the fishing line would comprise a lead, a sinker and a baited hook or lure. It is an object of this invention to disclose an ice fishing submarine which does not need to tow control wires through the ice to the submarine for power or to switch off power. It is yet a further object of this invention to disclose an ice fishing submarine utilizing a deployment member so that it can be positioned and activated under the water without having to contact the water.

One aspect of this invention provides for an ice fishing submarine for carrying an end portion of a fishing line radially away from an ice fishing hole comprising: i) a hull enclosing a propulsion system which includes a battery which powers an electric motor which turns a propeller; ii) a power switch to begin propulsion away from the ice hole; and, iii) a tether having an unfixed end secured to the submarine and configured to interrupt power to the propulsion system when the tether becomes taut. When the submarine travels the distance of the length of the tether radially away from the ice hole the tether then becomes taut thereby automatically switching power off to the propulsion system of the submarine, and thereby eliminating the necessity of running control wires extending down through the ice hole to the submarine and monitoring the travel of the submarine to turn off power at an appropriate time.

In an other aspect of this invention the ice fishing submarine for carrying an end portion of a fishing line radially away from an ice fishing hole comprises: i) a hull enclosing a propulsion system which includes an electric motor which turns a propeller; ii) a tether having an unfixed end attached to the submarine; and, iii) an internal bait lure compartment within the submarine having an external door which automatically opens when the tether line becomes taught. Then an end portion of the fishing line can be enclosed within the bait/lure compartment for convenient and unentangled placement within and transport away from the ice fishing hole.

Various other objects, advantages and features of this invention will become apparent to those skilled in the art from the following description in conjunction with the accompanying drawings.

FIGURES OF THE INVENTION

FIG. 1 is a cross sectional view of an ice fishing submarine of an ice fishing submarine in a launch position beneath an ice hole.

FIG. 2 is a plan view showing the subdivided bait/lure compartment as viewed along line 2-2 shown on FIG. 1.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a cross sectional view of an ice fishing submarine 20 in a launch position beneath an ice hole 14. Most generally an ice fishing submarine 20 for carrying an end portion of a fishing line 12 radially away from an ice fishing hole 14 comprises: i) a hull 22 enclosing a propulsion system 24 which includes a battery 26 which powers an electric motor 28 which turns a propeller 30; ii) a power switch 32 to begin propulsion away from the ice hole 14; and, iii) a tether 34 having an unfixed end secured to the submarine 20, which is configured to interrupt power to the propulsion system 24 when the tether 34 becomes taut. When the submarine 20 travels the distance of the length of the tether 34 radially away from the ice hole 14 the tether 34 then becomes taut thereby automatically switching power off to the propulsion system 24 of the submarine 20. The necessity of running control wires (not shown) extending down through the ice hole 14 to the submarine 20 and also task of monitoring the travel of the submarine 20 to turn off power at an appropriate time is thereby eliminated.

In the most preferred embodiment of the invention the submarine 20 further comprises a bait/lure compartment 36 for enclosing and carrying the end portion of the fishing line 12, said bait/lure compartment 36 having an external door 38 which automatically opens dumping the end portion of the fishing line 12 into the water when a pin 40, attached to the unfixed end portion of the tether 34, is pulled when the tether 34 becomes taut, and wherein a power switch 42 within the submarine 20 moves to a normally open position when the external door 38 is opened thereby turning off the submarine propulsion system 24. In one aspect of the invention the deployment member 44 comprises a deployment stick 45 and the radially extending member 46 comprises a cross stick 47 spaced upwardly from the bottom side portion of the deployment stick 45.

In the most preferred embodiment of the invention the ice fishing submarine 20 further comprises an elongate deployment member 44 to hold and push the submarine 20 down into the water 16 and thereafter point the submarine 20 in the desired direction of travel. The deployment member 44 and submarine 20 are configured so that propulsion power is automatically switched on in the submarine 20 when the deployment member 44 is disengaged from the submarine 20. The deployment member 44 thereby facilitates directed placement of the submarine 20 in the cold water without splashing from the propulsion system 24, and thereafter engages the propulsion system 24 without requiring one to reach in the cold water 16. Most preferably said lower end portion of the deployment member 44 is engaged within a top opening 46 in the submarine 20. The deployment member 44 most preferably further comprises a radially extending member 46 to better hold the submarine 20. The submarine 20 is configured so that power is switched on to the propulsion system 24 therein when the deployment member 44 is disengaged therefrom.

In the most preferred embodiment of the invention the ice fishing submarine 20 further comprises a longitudinal tunnel 25 extending through the hull 22. The propeller 30 is rotated within a central portion of a longitudinal tunnel 46 thereby preventing entanglements with the propeller 30. The ice fishing submarine 20 ice further comprises two laterally spaced longitudinal blades 48 each extending above and along a substantial portion of the length of the submarine 20 to facilitate sliding immediately below and in contact with the ice 18 with minimal resistance. Most preferably a bottom portion of the submarine hull 22 is detachable to allow access for maintenance and battery 26 regeneration. Regeneration is intended to include either recharging or interchanging batteries 26.

FIG. 2 is a plan view showing a subdivided bait/lure compartment 36 as viewed along line 2-2 shown on FIG. 1. The bait/lure compartment 36 comprises three chambers 37, one chamber 37 to carry a lead line 48 having one end portion attached to the end portion of the fishing line 12, a second chamber 37 to carry a sinking weight 50 attached to the lead line 48, and a third chamber 37 to carry a lure/baited hook 52 also attached to the lead line 48. The sinking weight chamber 37 in the bait/lure compartment 36 has a sloped floor 54 so that when the external door 38 is opened the sinking weight 50 will slide therefrom pulling after it the lead line 48 and the lure/baited hook 52 with it. FIG. 2 also shows the use of downwardly extending whiskers 51 in the bait/lure chamber 37 of the bait/lure compartment 36 to retain the baited hook/lure 52 therein. The wiskers 51 are sufficiently flexible so that the lure/baited hook can be pushed through the wiskers 51 to be retained therein, and then when the door 38 opens and the sinking weight 50 pulls thereon, the baited hook/lure 52 will bend the whiskers 51, sliding from the compartment 36. The whiskers 51 are sufficiently inflexible to prevent the baited hook/lure from sliding out of the chamber 37 without being pulled on.

Another general aspect of this invention includes an ice fishing submarine 20 for carrying an end portion of a fishing line 12 radially away from an ice fishing hole 14 which comprises: i) a hull enclosing a propulsion system 24 which includes an electric motor 28 which turns a propeller 30; ii) a tether 34 having an unfixed end attached to the submarine 20; and, iii) an internal bait/lure compartment 36 within the submarine 20 having an external door 38 which automatically opens when the tether 34 becomes taught. Then an end portion of the fishing line 12 can be enclosed within the bait/lure compartment 36 for convenient and unentangled placement within and transport away from the ice fishing hole 14.

While the invention has been described with preferred specific embodiments thereof, it will be understood that this description is intended to illustrate and not to limit the scope of the invention, which is defined by the following claims.

I claim:

1. An ice fishing submarine for carrying an end portion of a fishing line radially away from an ice fishing hole comprising:
   i) a hull enclosing a propulsion system which includes a battery which powers an electric motor which turns a propeller;
   ii) a power switch to begin propulsion; and,
   iii) a tether having an unfixed end secured to the submarine and configured to interrupt power to the propulsion system when the tether becomes taut; and
   iv) a bait/lure compartment within the submarine for enclosing and carrying the end portion of the fishing line, said bait/lure compartment having an external door which automatically opens dumping the end portion of the fishing line into the water when a pin, attached to the unfixed end portion of the tether, is pulled when the tether becomes taut;
   so that when the submarine travels the distance of the length of the tether radially away from the ice hole, the tether then becomes taut and thereby automatically pulls the pin, opening the external door and switching power off to the propulsion system of the submarine, thereby eliminating the necessity of running control wires extending down through the ice hole to the submarine, and monitoring the travel of the submarine to turn off power at an appropriate time, as well as preventing any entanglement with the bait/lure which is enclosed within the submarine during launching and motion of the submarine away from the ice fishing hole.

2. An ice fishing submarine as in claim 1 wherein a power switch within the submarine moves to a normally open position when the external door is opened thereby turning off the submarine propulsion system.

3. An ice fishing submarine as in claim 2 further comprising an elongate deployment member to hold and push the submarine down into the water and thereafter point the submarine in the desired direction of travel, said deployment member and submarine configured so that propulsion power is automatically switched on in the submarine when the deployment member is disengaged from the submarine, said deployment member thereby facilitating directed placement of the submarine in the cold water without splashing from the propulsion system, and thereafter engaging the propulsion system without requiring one to reach in the cold water.

4. An ice fishing apparatus as in claim 3 wherein said lower end portion of the deployment member is engaged within a top opening in the submarine, and wherein the deployment member further comprises a radially extending member to better hold the submarine and wherein the submarine is configured so that power is switched on to the propulsion system therein when the deployment member is disengaged therefrom.

5. An ice fishing submarine as in claim 4 wherein the deployment member comprises a deployment stick and the radially extending member comprises a cross stick spaced upwardly from the bottom side portion of the deployment stick.

6. An ice fishing submarine as in claim 1 further comprising a longitudinal tunnel extending through the hull and wherein the propeller is rotated within a central portion of a longitudinal tunnel thereby preventing entanglements with the propeller.

7. An ice fishing submarine as in claim 1 further comprising two laterally spaced longitudinal blades extending above and along a substantial portion of the length of the submarine to facilitate sliding immediately below and in contact with the ice with minimal resistance.

8. An ice fishing submarine as in claim 1 wherein a bottom portion of the submarine hull is detachable to allow access for maintenance and battery regeneration.

9. An ice fishing submarine as in claim 2 wherein the bait/lure compartment comprises three chambers, one to carry a lead line having one end portion attached to the end portion of the fishing line, one to carry a sinking weight attached to the lead line, and one to carry a lure/baited hook also attached to the lead line.

10. An ice fishing submarine as in claim 9 wherein the sinking weight chamber in the bait/lure compartment has a sloped floor so that when the external door is opened the sinking weight will slide therefrom pulling after it the lead line and the lure/baited hook.

11. An ice fishing submarine as in claim 9 wherein the baited hook/lure chamber comprises flexible whiskers to prevent a baited hook/lure pushed therethrough from sliding out of the chamber without being pulled on.

12. An ice fishing submarine for carrying an end portion of a fishing line radially away from an ice fishing hole comprising:
  i) a hull enclosing a propulsion system which includes a battery which powers an electric motor which turns a propeller;
  ii) a tether having an unfixed end attached to the submarine; and,
  iii) an internal bait lure compartment within the submarine having an external door which automatically opens when the tether line becomes taut;
  so that an end portion of the fishing line can be enclosed within the bait/lure compartment for convenient and unentangled placement within and transport away from the ice fishing hole.

* * * * *